United States Patent [19]

Yasuhara et al.

[11] Patent Number: 4,752,788

[45] Date of Patent: Jun. 21, 1988

[54] INK JET RECORDING HEAD

[75] Inventors: Takeshi Yasuhara; Makoto Nishimura, both of Kanagawa, Japan

[73] Assignee: Fuji Electric Co., Ltd., Kanagawa, Japan

[21] Appl. No.: 903,789

[22] Filed: Sep. 4, 1986

[30] Foreign Application Priority Data

| | | | |
|---|---|---|---|
| Sep. 6, 1985 | [JP] | Japan | 60-197413 |
| Feb. 25, 1986 | [JP] | Japan | 61-39778 |
| Feb. 25, 1986 | [JP] | Japan | 61-39779 |
| Feb. 25, 1986 | [JP] | Japan | 61-39780 |
| Apr. 9, 1986 | [JP] | Japan | 61-81670 |
| Aug. 13, 1986 | [JP] | Japan | 61-189853 |
| Aug. 13, 1986 | [JP] | Japan | 61-189854 |

[51] Int. Cl.⁴ .............. G01D 15/16

[52] U.S. Cl. .............. 346/140 R; 310/328; 310/367; 417/322

[58] Field of Search .............. 346/140; 310/328, 367; 239/102.2; 417/322

[56] References Cited

U.S. PATENT DOCUMENTS

| | | | |
|---|---|---|---|
| 3,955,204 | 5/1976 | Anton | 346/139 C |
| 4,032,929 | 6/1977 | Fischbeck | 346/140 |
| 4,487,662 | 12/1984 | Fischbeck | 346/140 X |
| 4,536,097 | 8/1985 | Nilsson | 346/75 X |
| 4,578,686 | 3/1986 | Vollert | 346/140 |
| 4,605,939 | 8/1986 | Hubbard | 346/140 |

*Primary Examiner*—Joseph W. Hartary
*Attorney, Agent, or Firm*—Finnegan, Henderson, Farabow, Garrett and Dunner

[57] ABSTRACT

An ink jet recording head in which the ink in an ink cavity is jetted in the form of a droplet from an ink nozzle by utilizing a piezo-electric effect. The recording head includes a piezo-electric plate made of piezo-electric material and having a plurality of elongated ink cavities formed therein, and a cover plate fixedly placed on the piezo-electric plate. In one of the embodiments, each of the plurality of elongated ink cavities has two deep grooves formed in the longitudinal direction of the ink cavities and a shallow groove provided between the two deep grooves. Voltage applying electrodes are provided on piezo-electric portions which form the shallow grooves.

3 Claims, 27 Drawing Sheets

FIG. 18
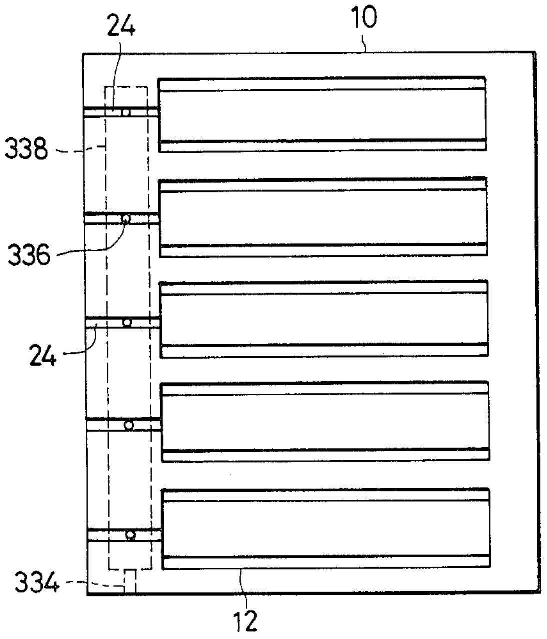
FIG. 19(A)
FIG. 19(B)
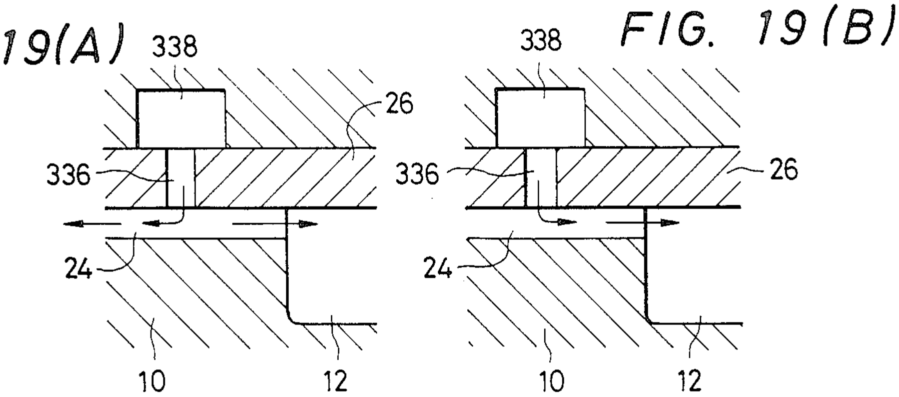

INK JET RECORDING HEAD

BACKGROUND OF THE INVENTION

This invention relates to a multi-nozzle type ink jet recording head which jets ink in the form of a droplet from the ink cavity by utilization of a piezo-electric effect.

A method of jetting ink in the form of a droplet from the ink cavity by utilization of a piezo-electric effect has been well known in the art. FIG. 1 is a sectional view of a conventional multi-nozzle type ink jet recording head disclosed by Japanese Patent Application (OPI) No. 49033/1977 (the term "OPI" as used herein means an "unexamined published application"). In FIG. 1, reference numeral 1 designates piezo-electric element cylinders each having a liquid chamber 2. Each of the cylinders 1 is communicated through its one end to an ink supplying path 3 and through its other end to an ink passage 4. A nozzle 5 is formed at the end of each of the ink passages 4. The ink is supplied through an ink supplying inlet6 into a common supply chamber 7, where it is pooled. In the recording head, the piezo-electric element cylinders 1 are buried in an epoxy resin body 8.

In the recording head thus constructed, the piezo-electric element cylinders 1 are selectively driven to decrease the volumes of the liquid chambers 2 thereof, so that the ink in the liquid chambers 2 are jetted from the nozzles 5.

In the above-described conventional ink jet recording head, the piezo-electric element cylinders 1 are employed as means for driving the nozzles 5, and the piezo-electric element cylinders 1 are each made up of a cylinder of piezo-electric material, and an inner electrode and an outer electrode which are provided respectively on the inner wall and the outer wall of the cylinder. In order to miniaturize the ink jet recording head, it is essential to miniaturize the piezo-electric element cylinders 1 also. However, it is considerably difficult for the present manufacturing technique to manufacture a piezo-electric element cylinder extremely small both in outside diameter and in inside diameter and to form the inner electrode on the inner wall of the cylinder. For instance in the case where it is required to arrange nozzles outlets 40 $\mu m \times 40$ $\mu m$ at intervals of 1 mm, it is impossible to miniaturize the piezo-electric element cylinders 1 to the extent that the latter 1 can be arranged at intervals of 1 mm. That is, the outside diameter of each piezo-electric element cylinder 1 should be 0.5 mm in maximum, and the inside diameter should, of course, be smaller than 0.5 mm. In addition, it is required to form the inner electrode on the inner wall of the cylinder 1. It is impossible for the current manufacturing technique to manufacture such piezo-electric element cylinders. Accordingly, the outside and inside diameters of the conventional piezo-electric element cylinders are larger than those which have been mentioned above. Therefore, the conventional ink jet recording head suffers from a difficulty that, as shown in FIG. 1, the width $L_2$ of the body 8 is much larger than the width $L_1$ of the nozzle 5.

In addition, it is possible but difficult to bury the small piezo-electric element cylinders 1 in the epoxy resin body 8 and to form the extremely thin ink supplying paths 3, ink passage 4 and nozzles 5 in the body 8.

SUMMARY OF THE INVENTION

In view of the foregoing, an object of this invention is to provide a compact ink jet recording head which can be readily manufactured.

The foregoing object of the invention has been achieved by the provision of an ink jet recording head in which, according to the invention, a plurality of elongated ink cavity grooves are formed in a piezo-electric plate made of piezo-electric material and covered with a cover plate to provide a plurality of elongated ink cavities.

BRIEF DESCRIPTION OF THE DRAWINGS

FIG. 18 is a diagram for a description of the relationships between ink nozzles, ink supplying inlets and an ink supplying chamber in the embodiment.

FIG. 19 is a diagram for a description of the flow of ink in the embodiment.

Figure 24A:
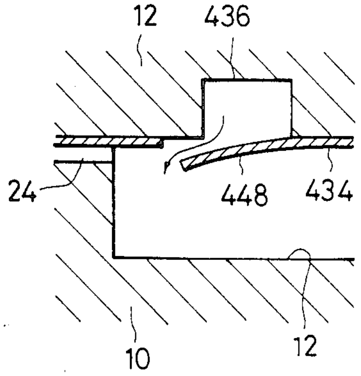
Figure 24B:
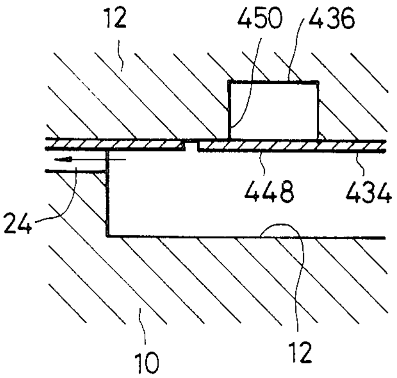

The parts (A) and (B) of FIG. 24 are diagrams of a description of the flow of ink in the fourteenth embodiment.

Figure 25:
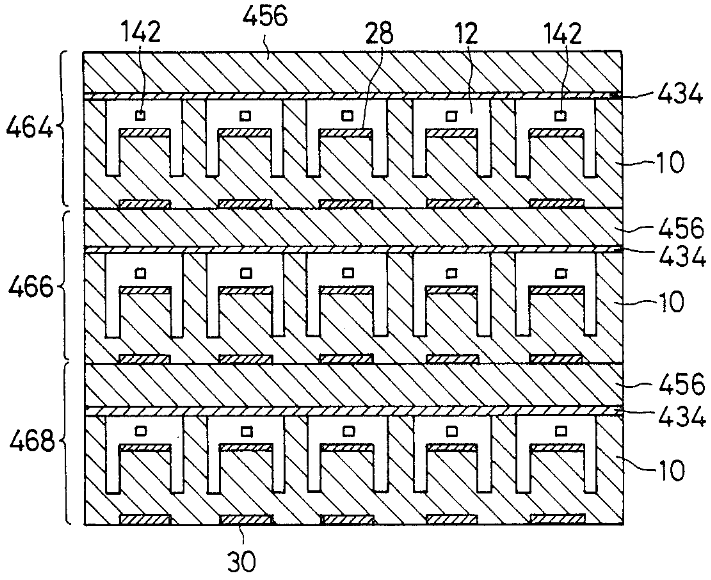
Figure 25B:
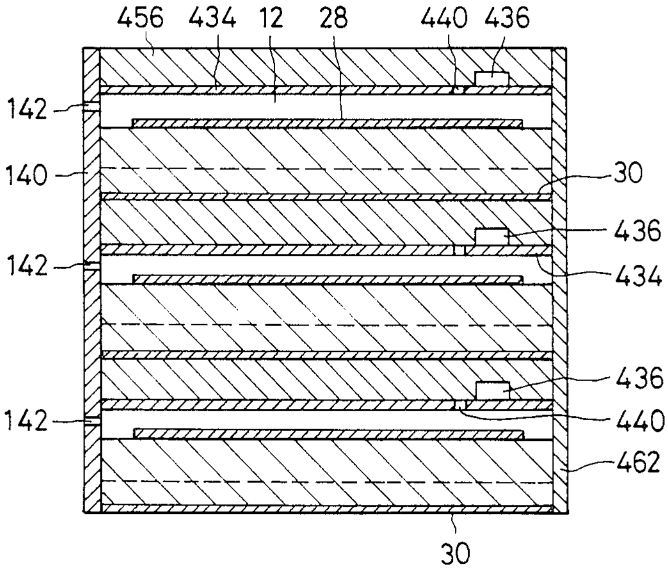

FIGS. 25A & B show a fifteenth embodiment of the invention. More specifically, the parts (A) and (B) of FIG. 25 are a cross-sectional view and a longitudinal-sectional view of the embodiment, respectively.

Figure 26A:
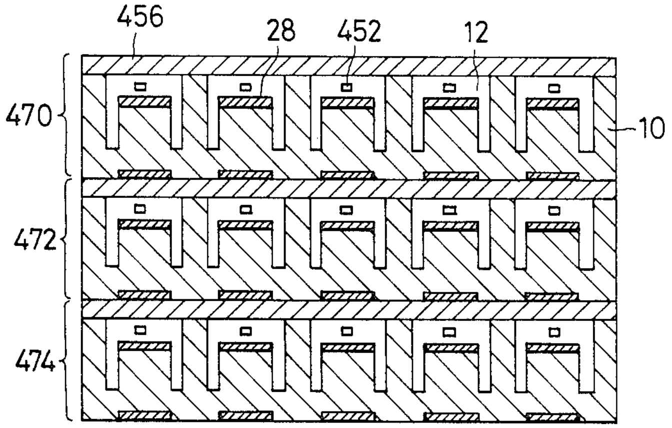
Figure 26B:
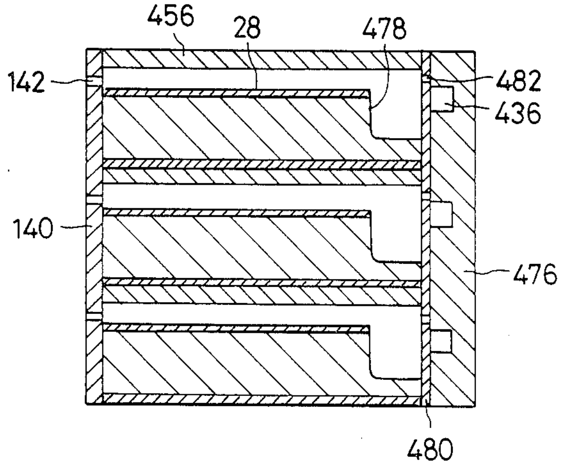

FIGS. 26A and B show a sixteenth embodiment of the invention. More specifically, the parts (A) and (B) of FIG. 26 are a cross-sectional view and a longitudinal-sectional view of the embodiment, respectively.

Figure 27:
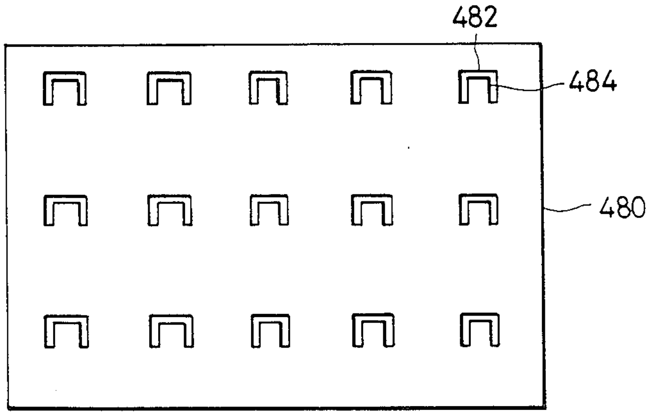

FIG. 27 is a plan view showing an ink supplying inlet board in the sixteenth embodiment.

Figure 28A:
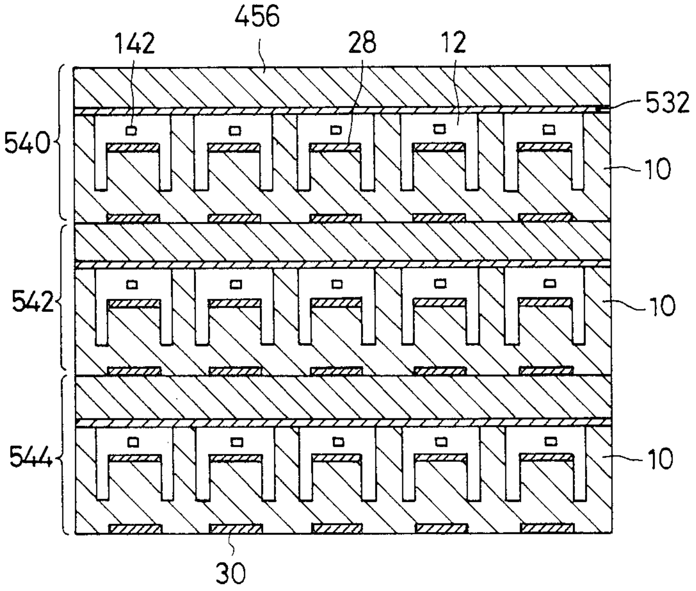
Figure 28B:
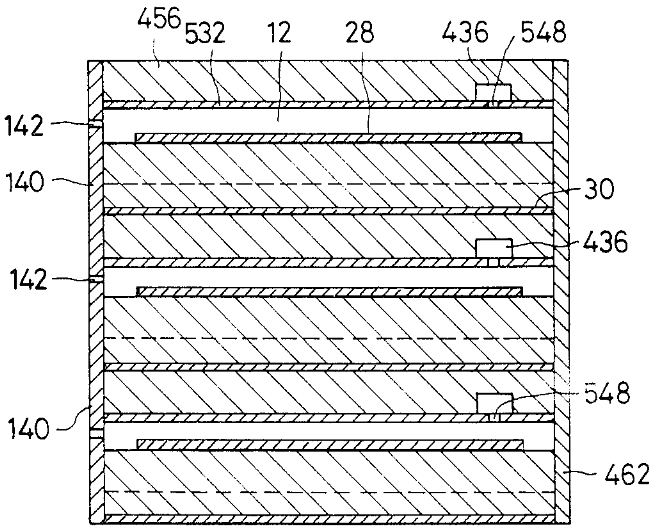

FIGS. 28A and B show a seventeenth embodiment of the invention. More specifically, the parts (A) and (B) of FIG. 28 are a cross-sectional diagram and a longitudinal-sectional diagram of the embodiment, respectively.

Figure 29A:
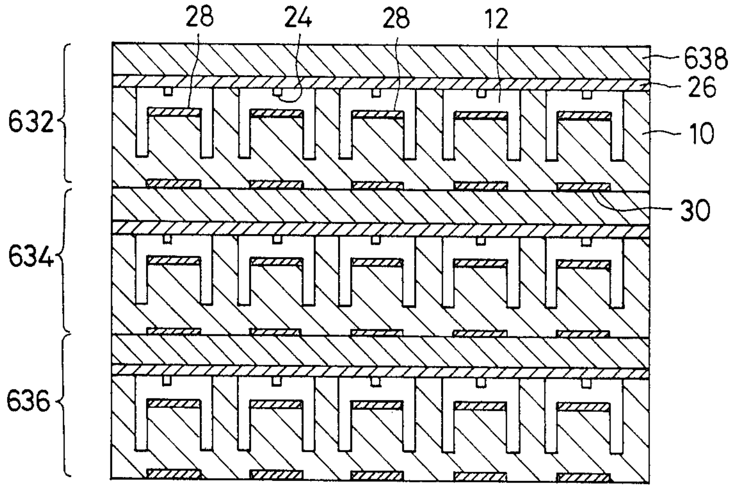
Figure 29B:
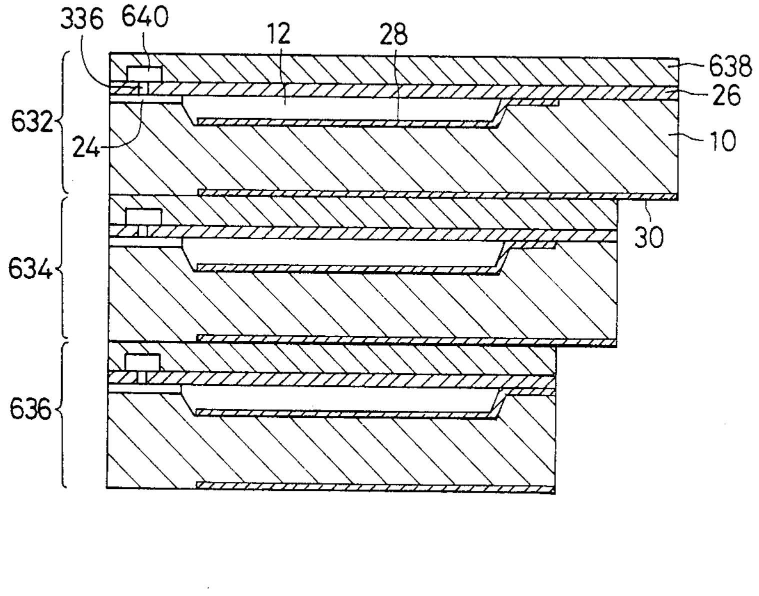

FIGS. 29A and B show an eighteenth embodiment of the invention. More specifically, the parts (A) and (B) of FIG. 29 are a cross-sectional diagram and a longitudinal-sectional diagram of the embodiment, respectively.

Figure 30A:
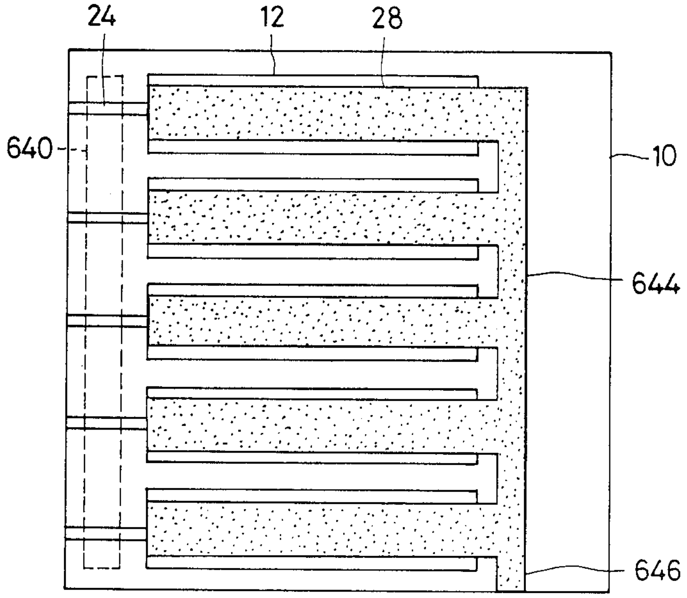
Figure 30B:
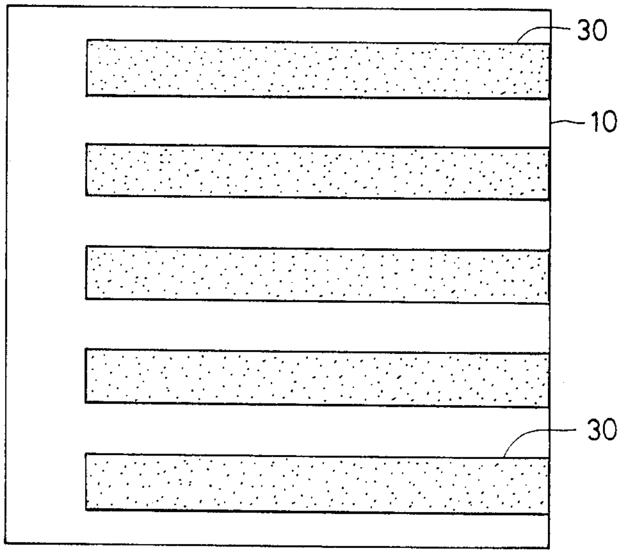

FIGS. 30A and B show a piezo-electric plate in the eighteenth embodiment. More specifically, the parts (A) and (B) of FIG. 30 are a top view and a bottom view of the piezo-electric plate, respectively.

Figure 31A:
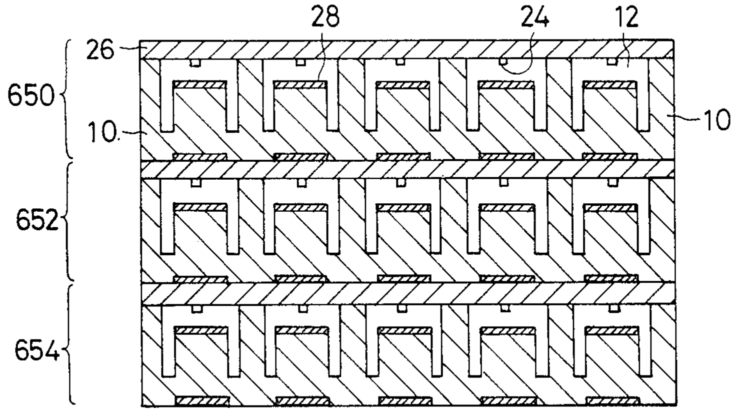
Figure 31B:
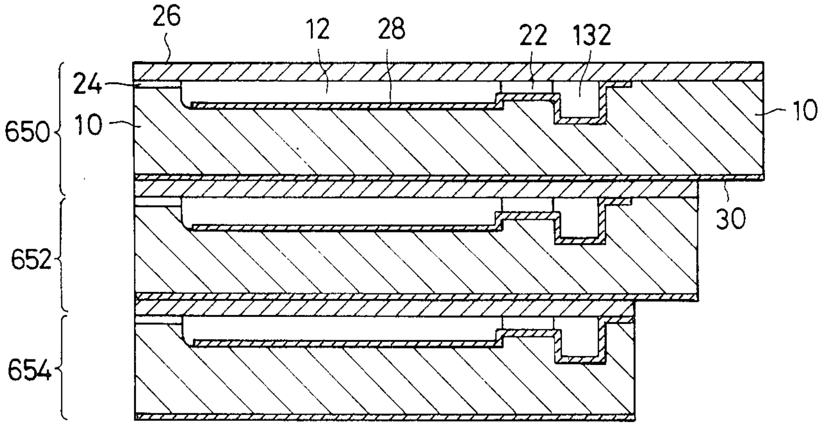

FIGS. 31A and B show a nineteenth embodiment of the invention. More specifically, the parts (A) and (B) of FIG. 31 are a cross-sectional diagram and a longitudinal-sectional diagram of the embodiment, respectively.

Figure 32A:
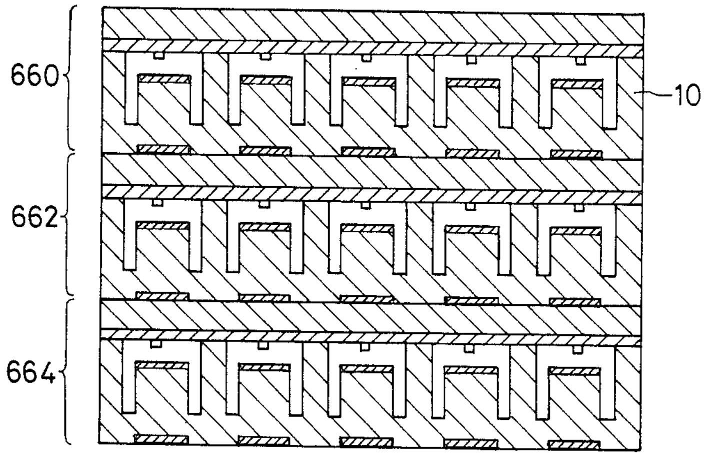
Figure 32B:
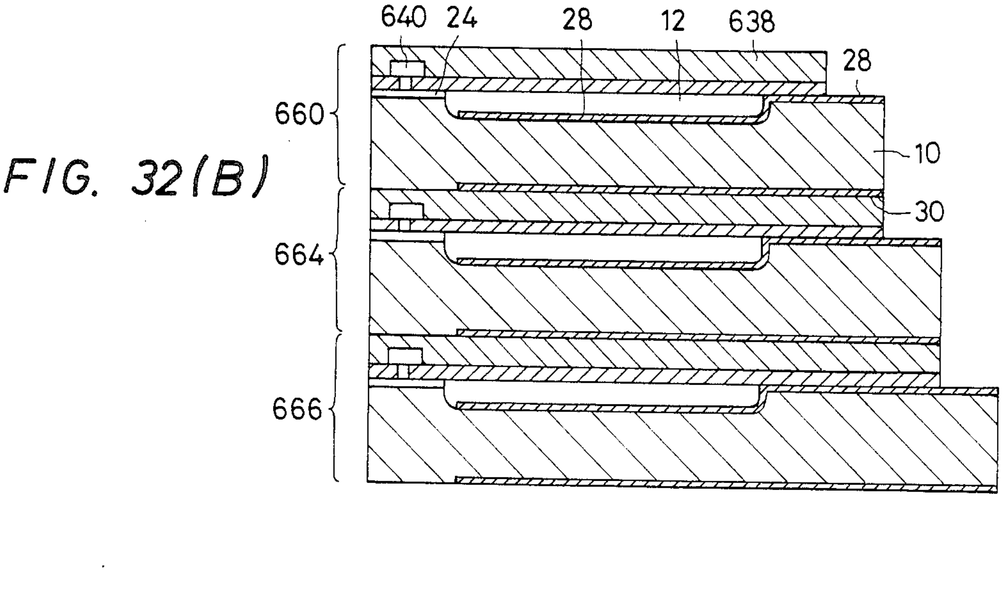

FIGS. 32A and B show a twentieth embodiment of the invention. More specifically, the parts (A) and (B) of FIG. 32 are a cross-sectional diagram and a longitudinal-sectional diagram of the embodiment, respectively.

Figure 33A:
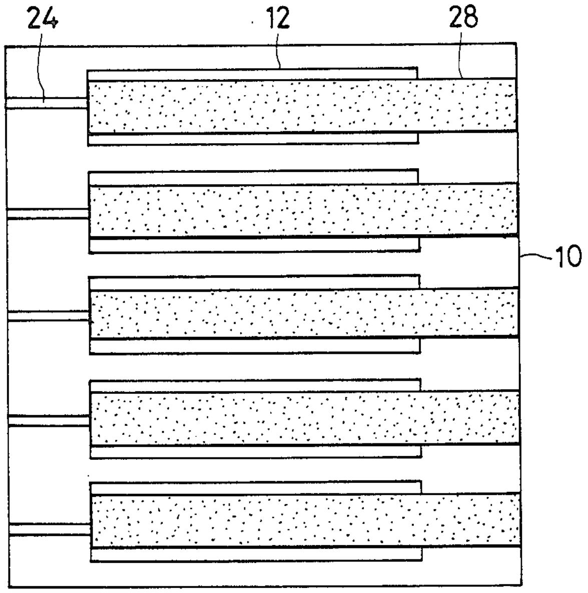
Figure 33B:
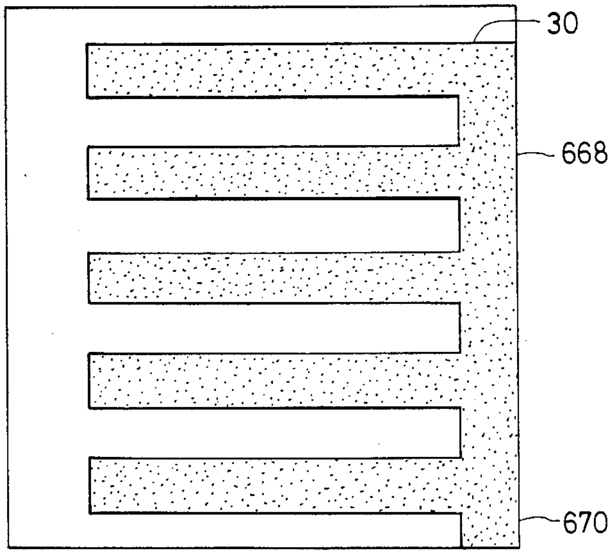

FIGS. 33A and B show a piezo-electric plate in the embodiment. More specifically, the parts (A) and (B) of FIG. 33 are a top view and a bottom view of the piezo-electric plate.

DETAILED DESCRIPTION OF THE PREFERRED EMBODIMENTS

Preferred embodiments of this invention will be described with reference to the accompanying drawings.

Figure 1:
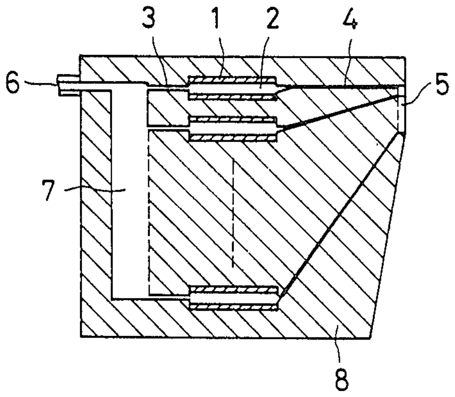
FIG. 1 is a sectional view of a conventional multi-nozzle type ink jet recording head.
Figure 2A:
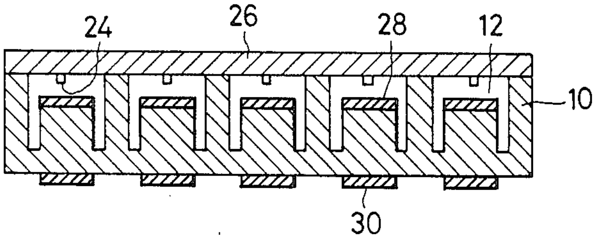
FIGS. 2A & B show a first embodiment of this invention. More specifically, the parts (A) and (B) of FIG. 2 are a cross-sectional diagram and a longitudinal sectional diagram of the first embodiment.
Figure 2B:
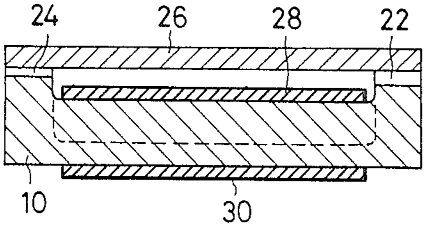
Figure 3A:
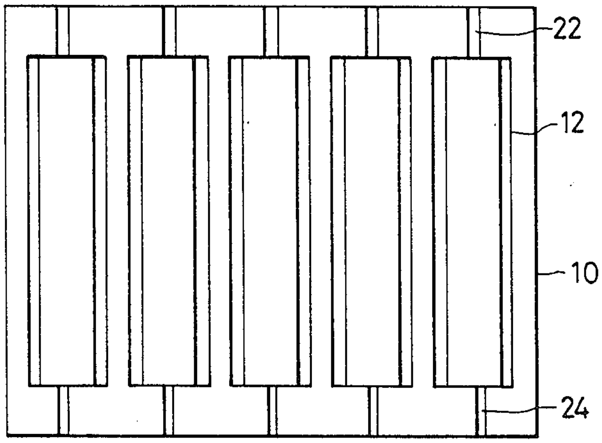
FIGS. 3A, B and C show a piezo-electric plate in the first embodiment. More specifically, the parts (A), (B) and (C) of FIG. 3 are a plan view, a cross-sectional view and a longitudinal-sectional view of the piezo-electric plate, respectively.
Figure 3B:
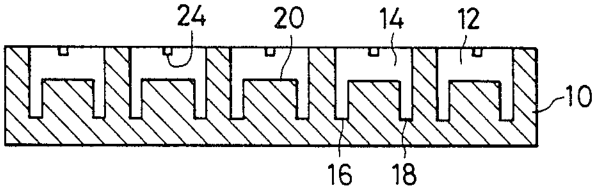
Figure 3C:
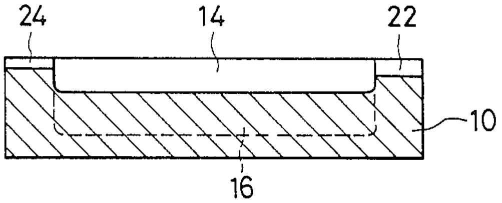
Figure 4:
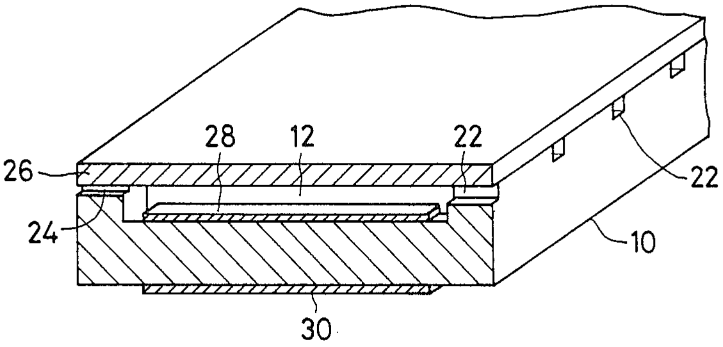
FIG. 4 is a perspective view, with parts cut away, showing the first embodiment.

FIG. 2 shows an ink jet recording head, a first embodiment of the invention. More specifically, the part (A) of FIG. 2 is a cross-sectional view of the ink jet recording head, and the part (B) of FIG. 2 is a longitudinal-sectional view of the ink jet recording head. FIG. 3 shows a piezo-electric plate in the ink jet recording head. More specifically, the part (A) of FIG. 3 is a plan view of the piezo-electric plate, the part (B) of FIG. 3 is a cross-sectional view of the piezo-electric plate, and the part (C) of FIG. 3 is a longitudinal-sectional view of the piezo-electric plate. FIG. 4 is a perspective view showing a part of the ink jet recording head.

In FIGS. 2 through 4, reference numeral 10 designates a flat-plate-shaped piezo-electric plate made of piezo-electric material. As shown in FIG. 2, the piezo-electric plate 10 has a plurality of ink cavities 12, and a plurality of ink supplying inlets 22 and a plurality of ink nozzles 24 which are communicated with the ink cavities 12, respectively. Each of the ink cavities 12 comprises: two deep grooves 16 and 18; and a shallow groove 14 between the deep grooves 16 and 18.

Referring back to FIG. 2, reference numeral 26 designates a cover plate coupled to the surface of the piezo-electric plate by bonding, welding or the like where the ink cavities and the ink nozzles are formed. In each of the ink cavities 12, a voltage applying electrode 28 is provided on a piezo-electric bank 20 as shown in FIG. 3. Electrodes 30 are provided on the bottom of the piezo-electric plate 10 in such a manner as to confront with the voltage applying electrodes 28 through the piezo-electric plate 10, respectively.

When a voltage is applied across a selected pair of electrodes 28 and 30 in the ink jet recording head thus constructed, the piezo-electric banks 20 between the electrodes 28 and 30 are expanded to decrease the volume of the ink cavity 12, as a result of which the ink in the ink cavity 12 is jetted in the form of a droplet from the ink nozzle 24 communicated with the ink cavity 12, and applied to the recording sheet (not shown). In this operation, the contraction of volume of the ink cavity 12 is mainly caused by the piezo-electric bank 20, and therefore the contraction of volume of the ink cavity 12 will not affect the adjacent ink cavities 12; that is, the cross-talk between the ink cavities is prevented.

Figure 5:
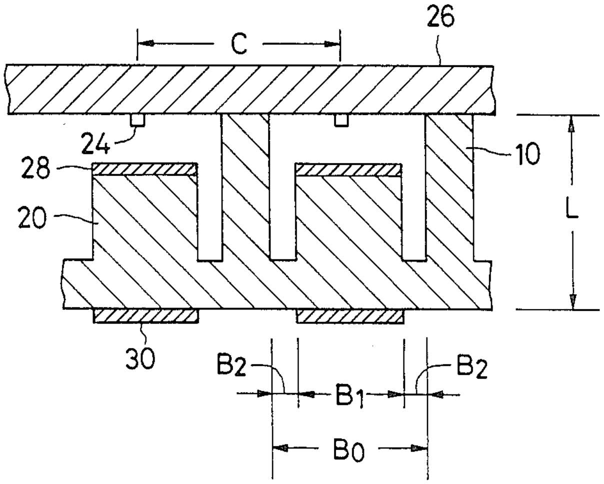
FIG. 5 is an enlarged sectional diagram showing the first embodiment.

In the first embodiment shown in FIGS. 2 through 4, as shown in FIG. 5 the size of each nozzle is 40 $\mu m \times 40$ $\mu m$ and the distance C between the nozzles is 1 mm, for instance. The thickness L of the piezo-electric plate 10 is 0.5 mm. The width $B_0$ of the ink cavities 12 is 0.7 mm, the width $B_1$ of the shallow grooves 14, i.e., the piezo-electric banks 20 is 0.6 mm, the width $B_2$ of the deep grooves 16 and 18 is 50 $\mu m$. The ink cavities 12 which are extremely small as described above can be formed with a dicing saw which is used for cutting semiconductor wafers. As cutting edges 15 $\mu m$ in thickness has been developed for a dicing saw of this type, the ink cavities 12 can be sufficiently satisfactorily formed with the dicing saw.

As is apparent from the above-description, in the ink jet recording head of the invention, the nozzles are provided, for instance, at intervals of 1 mm, and each nozzle is positioned substantially at the center of the width of the respective ink cavity 12, with the result that the distance between the central axes of any adjacent ink cavities is 1 mm, i.e., the ink cavities are arranged at intervals of 1 mm. Accordingly, the recording head can be made considerably compact.

Figure 6A:
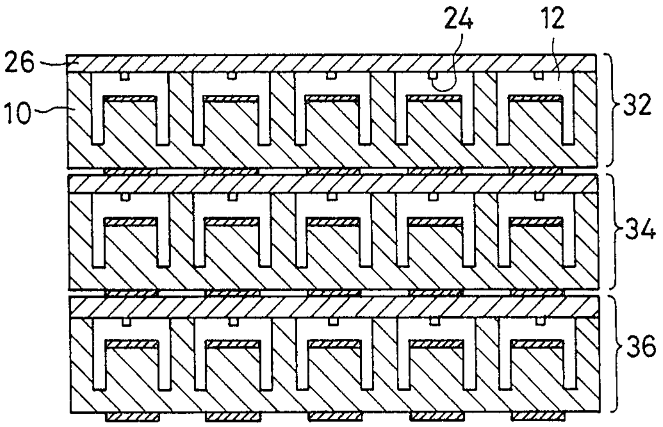
FIGS. 6A and B show a second embodiment of the invention. More specifically, the parts (A) and (B) of FIG. 6 are a cross-sectional diagram and a longitudinal-sectional view of the embodiment, respectively.
Figure 6B:
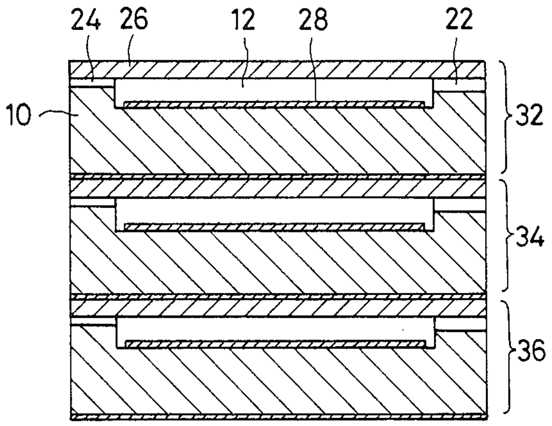

FIG. 6 shows an ink jet recording head assembly a second embodiment of the invention. More specifically, the part (A) of FIG. 6 is a cross-sectional view of the ink jet recording head, and the part (B) of FIG. 6 is a longitudinal-sectional view from FIG. 4, the ink jet recording head of the invention is in the form of a flat plate. In the second embodiment of the invention shown in FIG. 6, three ink jet recording heads 32, 34 and 36 shown in FIGS. 2 through 4 are laid one on another. The ink jet recording heads 32, 34 and 36 are coupled to one another with adhesive (not shown) to form the ink jet recording head assembly.

Figure 7:
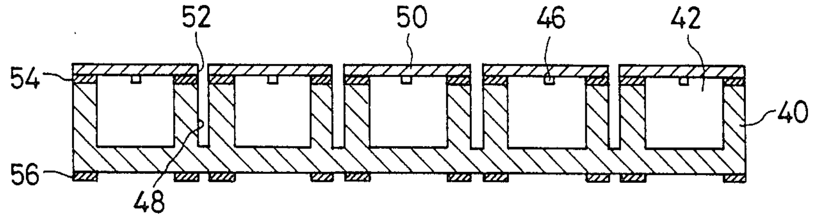
FIG. 7 is a sectional view of a third embodiment of the invention.
Figure 7A:
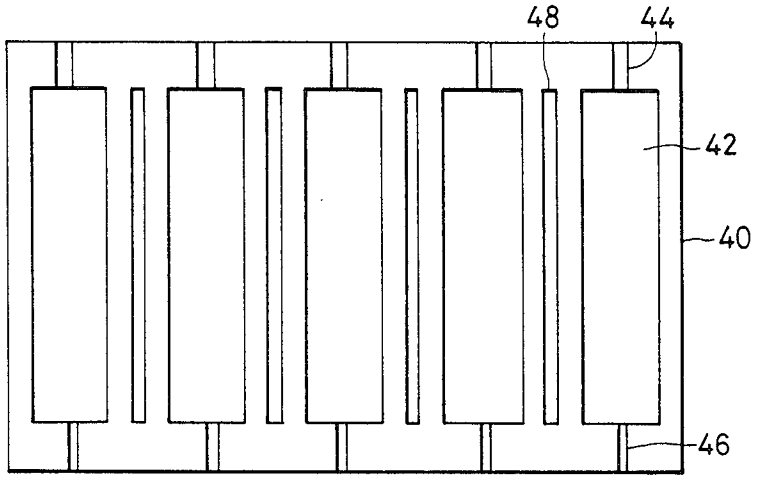
FIG. 7A is a plan view showing a piezo-electric plate in the third embodiment.
Figure 7B:
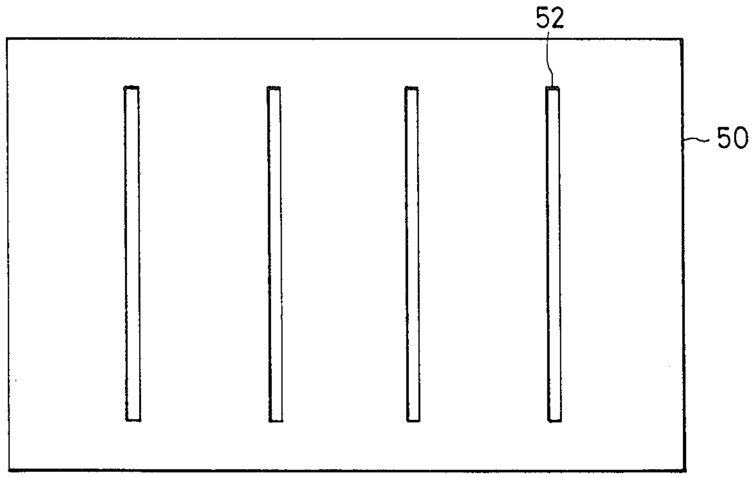
FIG. 7B is a plan view of a cover plate in the third embodiment.

FIG. 7 is a sectional view of an ink jet recording head, a third embodiment of the invention. In FIG. 7, reference numeral 40 designates a piezo-electric plate made of piezo-electric material. As shown in FIG. 7A, a plurality of ink cavities 42 equal to depth to one another, and a plurality of ink nozzles 46 and a plurality of ink supplying inlets 44 which are communicated with the ink cavities 42, respectively, are formed in the piezo-electric plate 40. Slits 48 are formed in the piezo-electric plate 40 in such a manner that the slits 48 are located between the adjacent ink cavities 42. In the region of each of the ink cavities, a voltage applying electrode 54 is provided on the surface of the piezo-electric plate 40, as shown in FIG. 7. And voltage applying electrodes 56 are provided on the bottom of the piezo-electric plate 40 in such a manner as to confront with the voltage applying electrodes 54 through the piezo-electric plate 40, respectively. A cover plate 50 is fixedly placed on the piezo-electric plate 40 thus constructed. As shown in FIG. 7B, elongated holes 52 are formed in the cover plate 50 in such a manner that they are confronted with the slits 48, respectively. Therefore, the ink cavities can readily contract independently of one another. That is, when a voltage is applied across any selected pair of electrodes 54 and 56, the piezo-electric element between the electrodes 54 and 56 contracts to pull the cover plate 50 inwardly, as a result of which the volume of the ink cavity 42 is decreased and the ink therein is jetted in the from of a droplet from the respective ink nozzle 46. In this operation, the contraction of the ink cavity 42 does not affect the adjacent ink cavities 42 owing to the presence of the elongated holes 52 and the slits 48; that is, cross-talk between the ink cavities is prevented.

Figure 8:
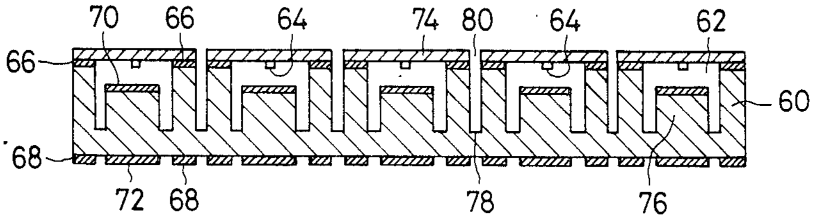
FIG. 8 is a sectional view of a fourth embodiment of the invention.
Figure 8A:
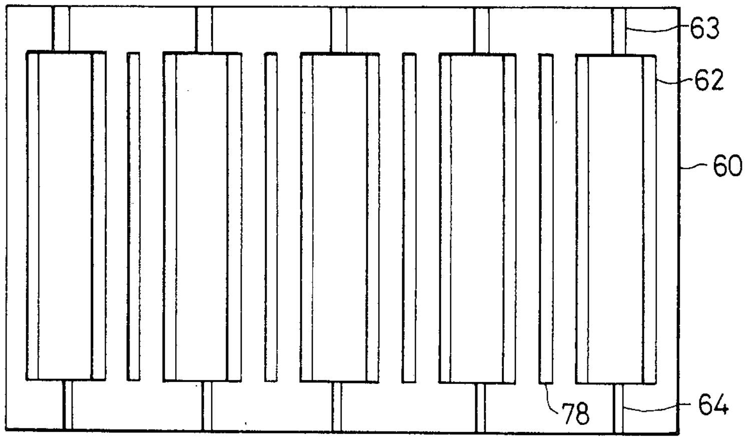
FIG. 8A is a plan view of a piezo-electric plate in the fourth embodiment.
Figure 8B:
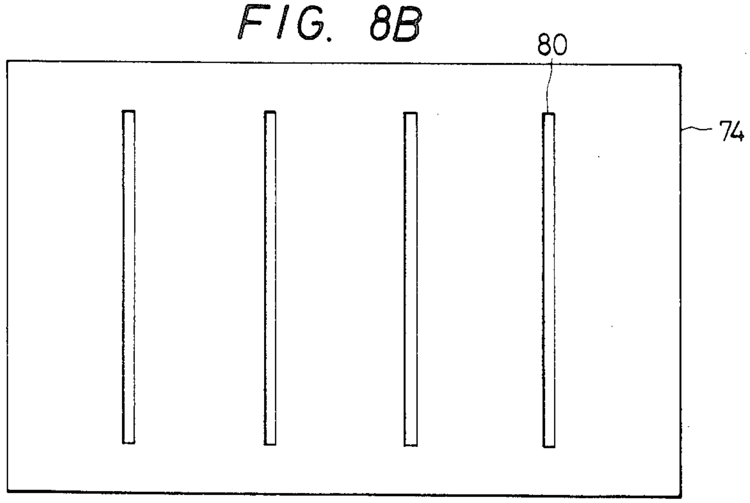
FIG. 8B is a plan view of a cover plate in the fourth embodiment.

FIG. 8 is a sectional view showing an ink jet recording head, a fourth embodiment of the invention. FIG. 8A is a plan view of a piezo-electric plate in the recording head, and FIG. 8B is a plan view of a cover plate in the recording head. Similarly as in the piezo-electric plate of FIG. 2, ink cavities 62, ink nozzles 64 and ink supplying inlets 63 are formed in a piezo-electric plate 60. Furthermore, similarly as in the case of FIGS. 7 and 7A, slits 78 are formed in the piezo-electric plate 60. Similarly as in the case of FIG. 2, electrodes 70 and 72 are provided on both sides of a piezo-electric bank 7b in each of the ink cavities. Similarly as in the case of FIG. 7, electrodes 66 and 68 are provided on the upper (top) surface and the lower (bottom) surface of the piezo-electric plate, respectively. Similarly as in the case of the elongated holes 52 shown in FIG. 7 and 7B, elongated holes 80 are formed in the cover plate 74. Voltages opposite in polarity to each other are applied respectively across the electrodes 66 and 68 and across the electrodes 70 and 72 so that the portion of the piezo-electric plate (hereinafter referred to as "a piezo-electric portion") between the electrodes 66 and 68 contracts and the piezo-electric portion between the electrodes 70 and 72 expands, whereby the volume of the ink cavity is decreased. As the piezo-electric portion expansion and contraction occur simultaneously, the decrease of the volume of the ink cavity is larger than that of the volume of the ink cavity in the third embodiment shown in FIG. 7.

Figure 9A:
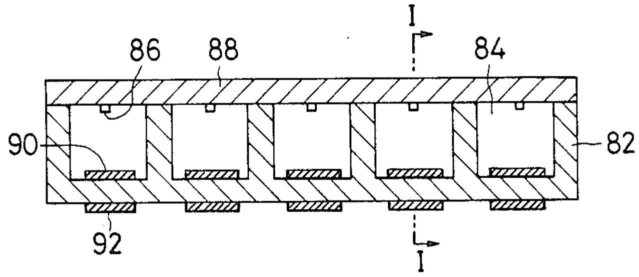
FIGS. 9A and B show a fifth embodiment of the invention. More specifically, the parts (A) and (B) of FIG. 9 are a cross-sectional view and a longitudinal-sectional view of the embodiment, respectively.
Figure 9B:
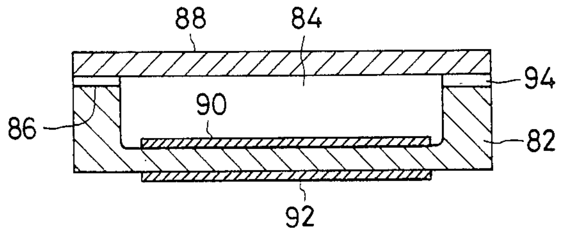

FIG. 9 shows an ink jet recording head, a fifth embodiment of the invention. More specifically, the parts (A) and (B) of FIG. 9 are a cross-sectional view and a longitudinal-sectional view of the recording head, respectively. The recording head comprises: a piezo-electric plate 82 made of piezo-electric material; and a cover plate 88. Similarly as in the recording head shown in FIG. 7, a plurality of ink cavities 84 equal in depth to one another, and a plurality of ink nozzles 86 and a plurality of ink supplying inlets 94 which are communicated with the ink cavities 84, respectively, are formed in the piezo-electric plate 82. An electrode 92 is provided on the inner surface of the bottom of each of the ink cavities. And electrodes 94 are provided on the lower surface of the piezo-electric plate 82 in such a manner that they are confronted with the electrodes 92 through the piezo-electric plate 82, respectively.

Figure 10:
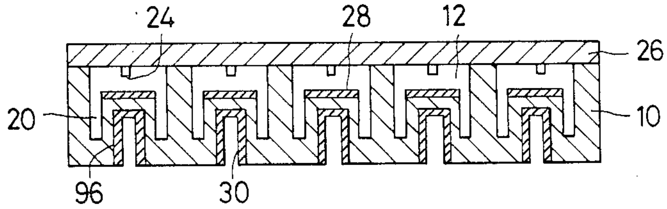
FIG. 10 is a cross sectional diagram showing a sixth embodiment of the invention.

FIG. 10 shows an ink jet recording head, a sixth embodiment of the invention. In other words, the sixth embodiment is one modification of the first embodiment shown in FIG. 2. A recess 30 is cut in the bottom of each of the piezo-electric banks 20 so that the piezo-electric bank expands more.

Figure 11A:
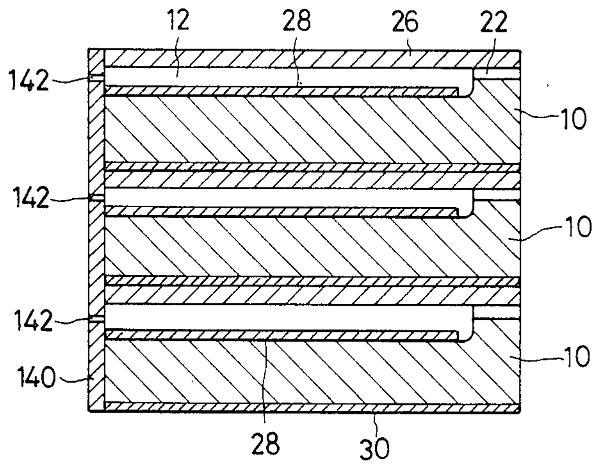
FIGS. 11A and B show a seventh embodiment of the invention. More specifically, the part (A) of FIG. 11 is a cross-sectional diagram of the seventh embodiment, and the part (B) of FIG. 11 is a perspective view, with parts cut away, showing the embodiment.
Figure 11B:
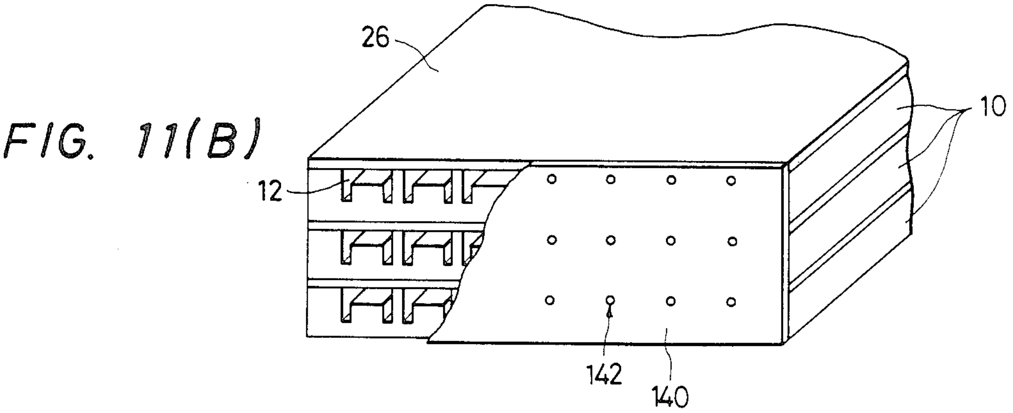

In the above-described embodiments, the ink cavities, the ink nozzles and the ink supplying inlets are provided as integral units, respectively. However, the ink nozzles and the ink supplying inlets may be separated from the ink cavities if necessary. FIG. 11 shows an ink jet recording head assembly, a seventh embodiment of the invention, provided according to the technical concept mentioned above. More specifically, the part (A) of FIG. 11 is a cross-sectional view of the ink jet recording head assembly, and the part (B) is a perspective view with parts cut away, showing the ink jet recording head assembly. In the embodiment, piezo-electric plates are provided in three layers. In FIG. 11, parts corresponding functionally to those already described with reference to FIGS. 2 through 7 are therefore designated by the same reference numerals.

In FIG. 11, reference numeral 140 designates a nozzle plate. A plurality of ink nozzles 142 are formed in the nozzle plate 140 in such a manner that they are communicated with the ink cavities, respectively. The nozzle plate is fixedly secured to the piezo-electric plates 10, 10 and 10 with adhesive. The ink nozzles 142 are formed in the nozzle plate 140 for instance by etching. Therefore, the ink nozzles 142 can be arranged at equal intervals.

Only the ink cavities 12 and the ink supplying inlets are formed in the piezo-electric plates 10. Accordingly, the number of manufacturing steps for forming the piezo-electric plate can be reduced as much as that for forming the ink nozzles in the piezo-electric plates.

Figure 12A:
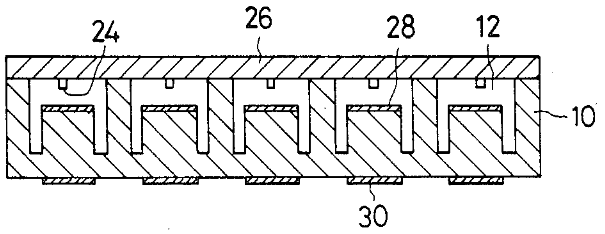
FIGS. 12A and B show an eighth embodiment of the invention. More specifically, the parts (A) and (B) of FIG. 12 are a cross-sectional diagram and a longitudinal-sectional diagram of the embodiment.
Figure 12B:
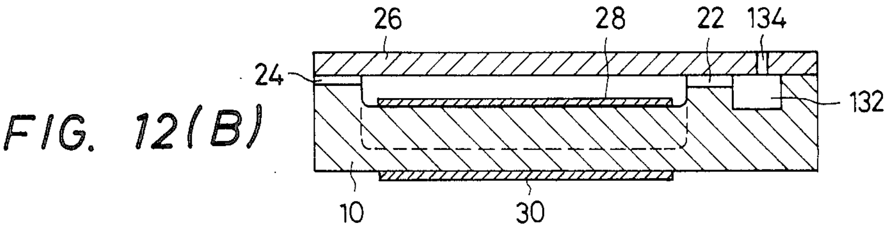
Figure 13A:
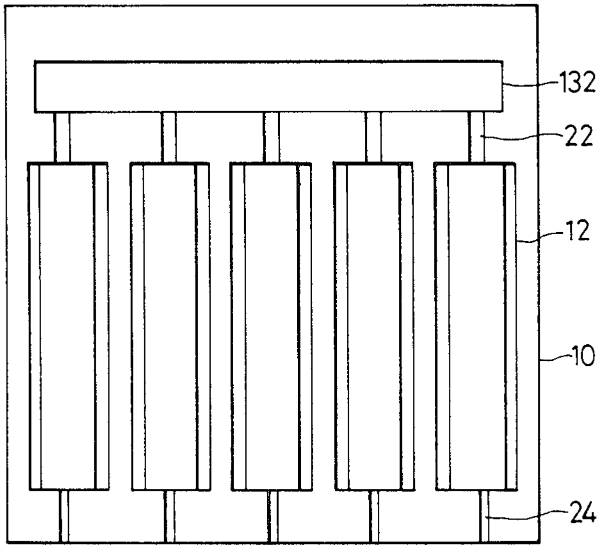
FIGS. 13A, B and C show a piezo-electric plate in the eighth embodiment. More specifically, the parts (A), (B) and (C) of FIG. 13 are a plan view, a cross-sectional view and a longitudinal-sectional view of the piezo-electric plate, respectively.
Figure 13B:
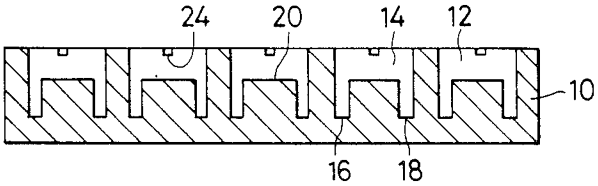
Figure 13C:
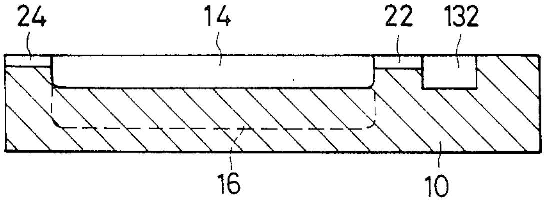

FIG. 12 shows an ink jet recording head, an eighth embodiment of the invention. More specifically, the parts (A) and (B) of FIG. 12 are a cross sectional diagram and a longitudinal-sectional diagram of the recording head, respectively. FIG. 13 shows a piezo-electric plate in the recording head. More specifically, the part (A) of FIG. 13 is a plan view of the piezo-electric plate, and the parts (B) and (C) of FIG. 13 are a cross-sectional diagram and a longitudinal-sectional diagram of the piezo-electric plate, respectively.

In FIGS. 12 and 13, parts corresponding functionally to those already described with reference to FIGS. 2 through 5 are therefore designated by the same reference numerals. The eighth embodiment shown in FIGS. 12 and 13 is different from the first embodiment shown in FIGS. 2 through 5 in that, similarly as in the case of the ink cavities 12, one ink supplying chamber 132 is cut in the piezo-electric plate 10 in such a manner that it crosses the longitudinal direction of the ink cavities 12. An ink tube coupling hole 134 is formed in the cover plate 26 in such a manner that it confronts with the ink supplying chamber 132. The ink supplying inlets 22 are communicated with the ink supplying chamber 132. Accordingly, the ink can be supplied into the ink cavities 12 by supplying it into the tank supplying chamber 132 through an ink tube (not shown).

In the eighth embodiment of the invention, similarly as in the case of the ink cavities 12, the ink supplying chamber 132 can be formed in the piezo-electric plate by cutting, and the ink can be supplied into the ink cavities through the ink tube connected to the ink tube coupling hole. Therefore, the ink jet recording head can be considerably readily manufactured.

Figure 14A:
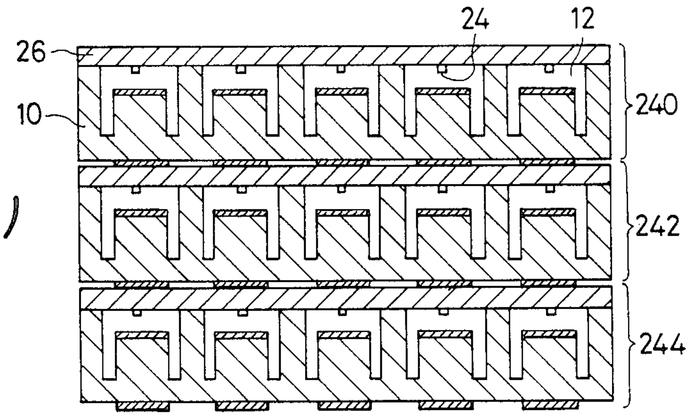
FIGS. 14A and B show a ninth embodiment of the invention. More specifically, the parts (A) and (B) of FIG. 14 are a cross-sectional diagram and a longitudinal-sectional diagram of the ninth embodiment, respectively.
Figure 14B:
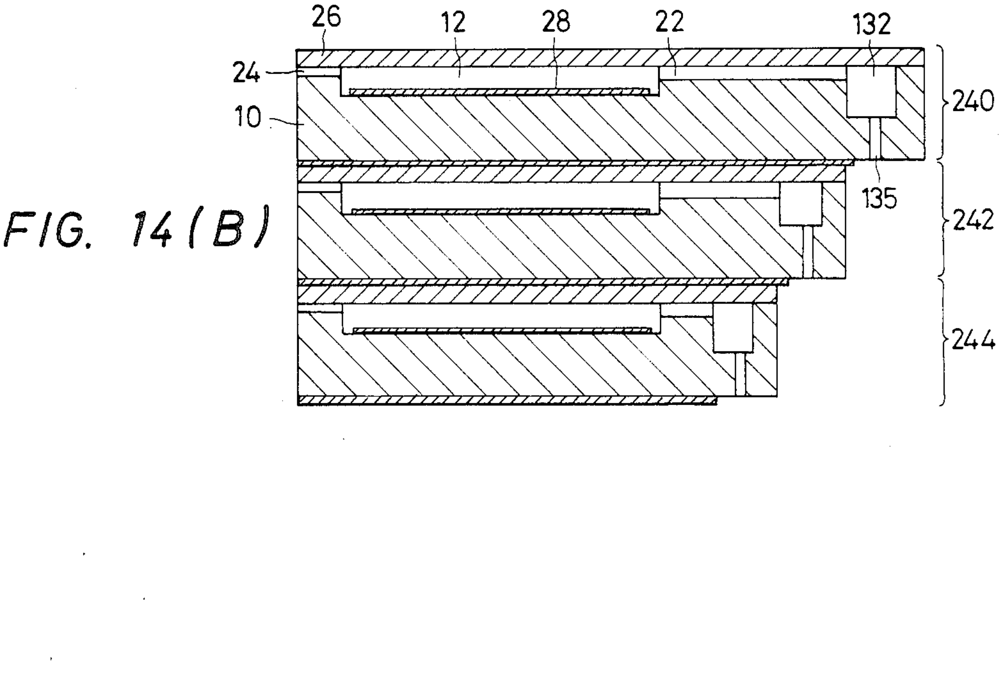

FIG. 14 shows an ink jet recording head assembly, a ninth embodiment of the invention. More specifically, the parts (A) and (B) of FIG. 14 are a cross-sectional diagram and a longitudinal diagram of the recording head assembly, respectively. As is apparent from FIG. 4, the ink jet recording head of the invention is in the form of a flat plate (hereinafter referred to as "an ink jet recording head unit" when applicable, for convenience in description). In the ninth embodiment, three ink jet recording head units 240, 242 and 244 are laid one on another, or in three layers. It should be noted that the ink supplying chamber in the second recording head unit 242 is farther from the ink cavities 12 in the longitudinal direction of the latter 12 than that in the third recording head unit 244 so that the ink tube coupling hole of the second recording head unit may not be covered by the third recording head unit, i.e., the ink tube can be connected to the ink tube coupling hole, and similarly the ink supplying chamber in the first recording head unit 240 is farther from the ink cavities 12 than that in the second recording head unit 242. The recording head units 240, 242 and 244 are joined together with adhesive (not shown). The ink tube coupling holes 135 are formed in the piezo-electric plates 10, 10 and 10, respectively.

Figure 15A:
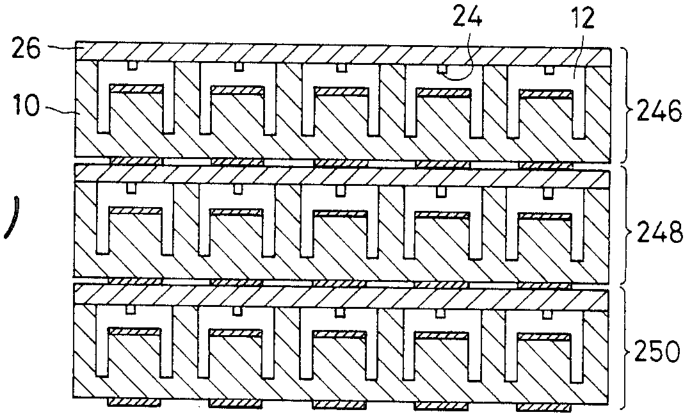
FIGS. 15A and B show a tenth embodiment of the invention. More specifically, the parts (A) and (B) of FIG. 15 are a cross-sectional diagram and a longitudinal-sectional diagram of the embodiment, respectively.
Figure 15B:
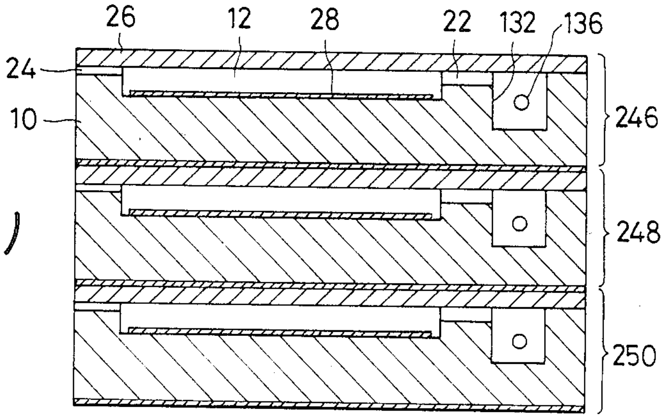

FIG. 15 shows an ink jet recording head assembly, a tenth embodiment of the invention. More specifically, the parts (A) and (B) of FIG. 15 are a cross-sectional view and a longitudinal-sectional view of the recording head assembly, respectively. In each of the ink jet recording head units 246, 248 and 250, an ink tube coupling hole 136 is formed in one side wall, in the lateral direction, of the ink supplying chamber 132 formed in the piezo-electric plate 10. Therefore, in the tenth embodiment of the invention, the ink jet recording head units 246, 248 and 250 equal in configuration to one another can be laid one on another.

Figure 16A:
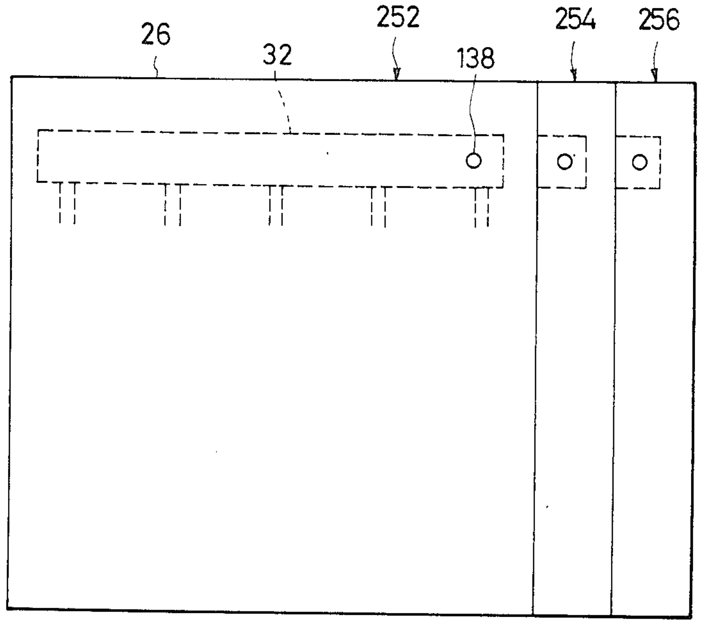
FIGS. 16A and B show an eleventh embodiment of the invention. More specifically, the parts (A) and (B) of FIG. 16 are a plan view and a side view of the embodiment, respectively.
Figure 16B:
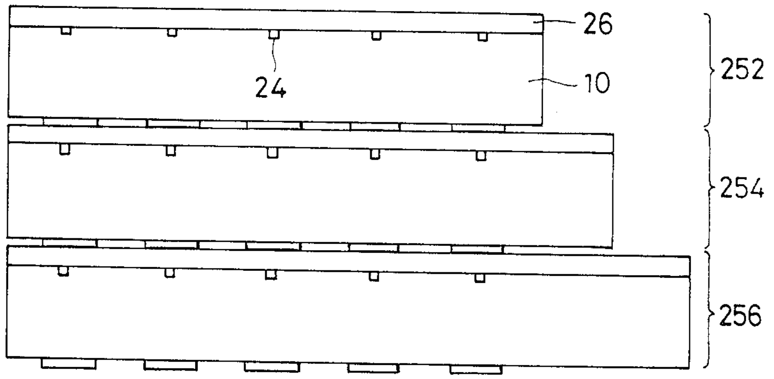

FIG. 16 shows an ink jet recording head assembly, an eleventh embodiment of the invention. More specifically, the parts (A) and (B) of FIG. 16 are a plan view and a side view of the recording head assembly, respectively.

In the eleventh embodiment shown in FIG. 16, the second recording head unit 254 is made longer in the longitudinal direction of the ink supplying chamber 132 than the first recording head unit 252 to expose the ink tube coupling hole 138, and similarly the third recording head unit 256 is made longer than the second recording head unit 254 for the same purpose. The ink tube coupling hole 138 is formed in each of the cover plates 26.

Figure 17A:
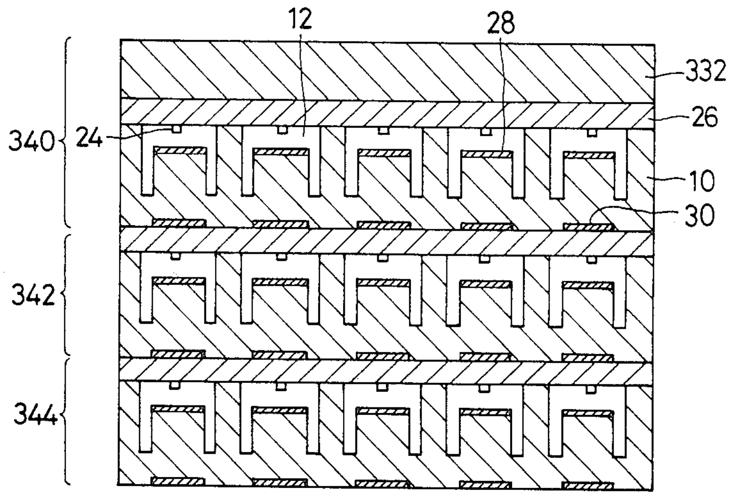
FIGS. 17A and B show a twelfth embodiment of the invention. More specifically, the parts (A) and (B) of FIG. 17 is a cross-sectional diagram and a longitudinal-sectional diagram of the embodiment, respectively.
Figure 17B:
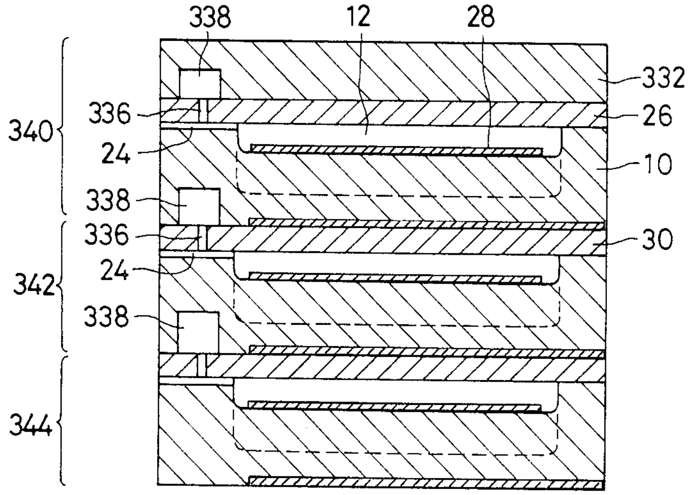

FIG. 17 shows an ink jet recording unit assembly, a twelfth embodiment of the invention. More specifically, the parts (A) and (B) of FIG. 17 are a cross-sectional diagram and a longitudinal-sectional diagram of the recording unit assembly, respectively. In FIG. 17, parts corresponding functionally to those which have been described with reference to FIGS. 2 through 5 are therefore designated by the same reference numerals.

The ink jet recording head assembly of FIG. 17 comprises three ink jet recording head units 340, 342 and 344 laid one on another. Similarly as in the above-described embodiments, each of the ink jet recording head units is essentially made up of the piezo-electric plate 10 and the cover plate 26. However, in the twelfth embodiment shown in FIG. 17, ink supplying inlets 336 are formed in the portion of the cover plate 26 which confronts with the ink nozzles 24 in such a manner that they are communicated with the ink nozzles 24. A surface plate 332 is fixedly placed on the upper surface of the cover plate 26. An ink supplying chamber 338 is formed in the surface plate 332 in such a manner that it is communicated with the ink supplying inlets 336 formed in the cover plate 26. The ink supplying chamber 338 formed in the surface plate 332 is used for the first recording head unit 340. Another ink supplying chamber 338 for the second recording head unit 342 is formed in the piezo-electric plate 10 of the first recording head unit 340.

The ink nozzles 24, the ink supplying inlets 336 and the ink supplying chamber 338 are arranged as shown in FIG. 18. More specifically, the elongated ink supplying chamber 338 is provided above the ink nozzles 24 in such a manner that the ink supplying chamber 338 crosses the ink nozzles 24, and the ink supplying inlets 336 are provided between the ink supplying chamber 338 and the ink nozzles 24. In FIG. 18, reference numeral 338 designates an ink injecting hole through which ink is injected into the ink supplying chamber 338. The ink injecting hole 338 is connected to an ink tube (not shown).

Referring back to FIG. 17, in the second recording head unit 342, similarly as in the case of the first recording head 340 ink supplying inlets 336 are formed in the portion of the cover plate 26 which confronts with the ink nozzles in such a manner that they are communicated with the ink nozzles. The relationships between the ink supplying inlets 336 and the ink supplying chamber 338 in the piezo-electric plate 10 of the first recording head 340 are the same as those which have been described with reference to FIG. 18. Another ink supplying chamber 338 is formed in the piezo-electric plate 10 of the second recording head unit 342.

In the third recording head unit 344 also, ink supplying inlets 336 are formed in the portion of the cover plate 26 which confronts with the ink nozzles 24 in such a manner that they are communicated with the ink nozzles. The relationships between the ink supplying inlets 336 and the ink supplying chamber 338 formed in the piezo-electric plate 10 of the second recording head unit 342 are the same as those which have been described with reference to FIG. 18 before.

The first (or second) recording head unit 340 (or 342) is laid on the second (or third) recording head unit 342 (or 344) in such a manner that the ink supplying chamber 338 formed in the piezo-electric plate 10 covers the ink supplying inlets 336 formed in the cover plate 26 of the second (or third) recording head 342 (or 344).

When a voltage is applied across a selected pair of electrodes 28 and 30 in the ink jet recording head assembly thus constructed, the piezo-electric portion between the electrodes 28 and 30 is expanded to decrease the volume of the ink cavity 12, as a result of which the ink in the ink cavity 12 is jetted in the form of a droplet from the ink nozzle 24 communicated with the ink cavity, and applied to the recording sheet (not shown).

In this operation, as shown in the part (A) of FIG. 19, a negative pressure is provided in the ink supplying inlet 336 on the side of the ink nozzle 24 when the ink in the ink cavity 12 is jetted from the ink nozzle 24. Therefore, the ink in the ink supplying chamber 338 is jetted through ink supplying inlet 336 by the ink in the ink cavity 12 as indicated by the arrows. As only one ink passage (or ink supplying inlet 24) is connected to the ink cavity 12, the ink corresponding to the reduction in volume of the ink cavity 12 is discharged through the ink supplying inlet 24. Thus, the change in volume of the ink cavity 12 is effectively utilized for the formation of an ink droplet.

As shown in the part (B) of FIG. 19 in detail, when the volume of the ink cavity 12 is contracted, a negative pressure is provided in the ink supplying inlet 336 on the side of the ink nozzle 24, and therefore the ink in the ink supplying chamber 338 is sucked through the ink supplying inlet 336 into the ink cavity 12, which prevents the suction of the air into the cavity 12 through the ink nozzle 24.

Figure 20A:
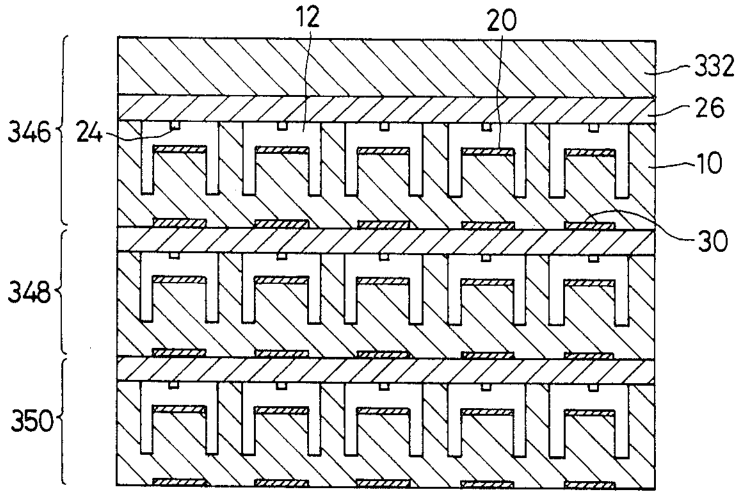
FIGS. 20A and B show a thirteenth embodiment of the invention. More specifically, the parts (A) and (B) of FIG. 20 are a cross-sectional diagram and a longitudinal-sectional diagram of the embodiment, respectively.
Figure 20B:
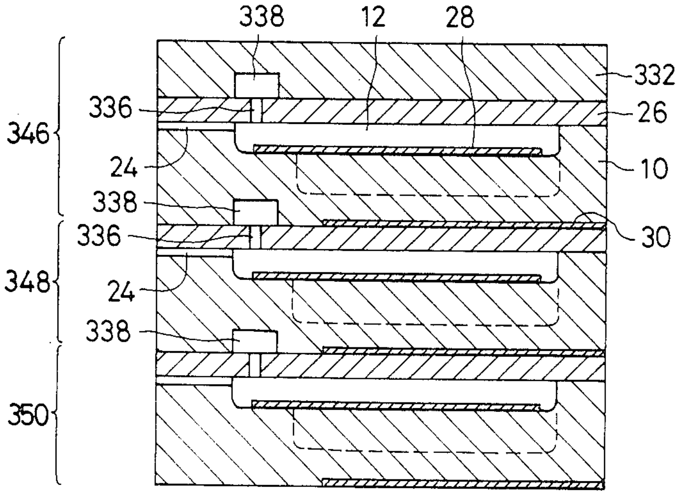

FIG. 20 shows an ink jet recording head assembly, a thirteenth embodiment of the invention. More specifically, the parts (A) and (B) of FIG. 20 are a cross-sectional diagram and a longitudinal-sectional diagram of the recording head assembly. In FIG. 20, parts corresponding functionally to those which have been described with reference to FIGS. 17 through 19 are therefore designated by the same reference numerals.

The thirteenth embodiment is different from the twelfth embodiment in the following point: In the twelfth embodiment, the ink supplying inlets 336 are provided immediately above the ink nozzles 24 and communicated through the ink nozzles 24 to the ink cavities 12, respectively. On the other hand, in the thirteenth embodiment, the ink supplying inlets 336 are provided on the same side as the ink nozzles 24, but the ink supplying inlets are provided above the ink cavities 12 and communicated directly with the ink cavities. In FIG. 20, reference numerals 346, 348 and 350 designate the recording head units which are constructed as described above, and corresond to the recording head units 340, 342 and 344 in the twelfth embodiment.

Figure 21A:
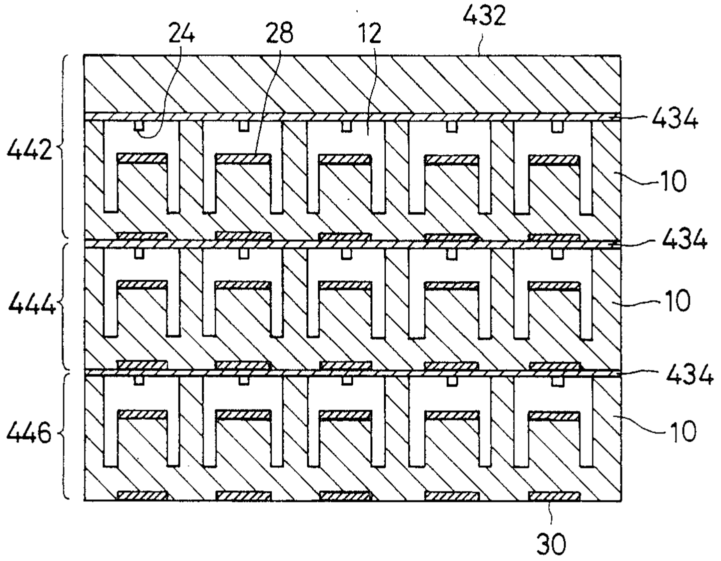
FIGS. 21A and B show a fourteenth embodiment of the invention. More specifically, the parts (A) and (B) of FIG. 21 are a cross-sectional diagram and a longitudinal-sectional diagram of the embodiment, respectively.
Figure 21B:
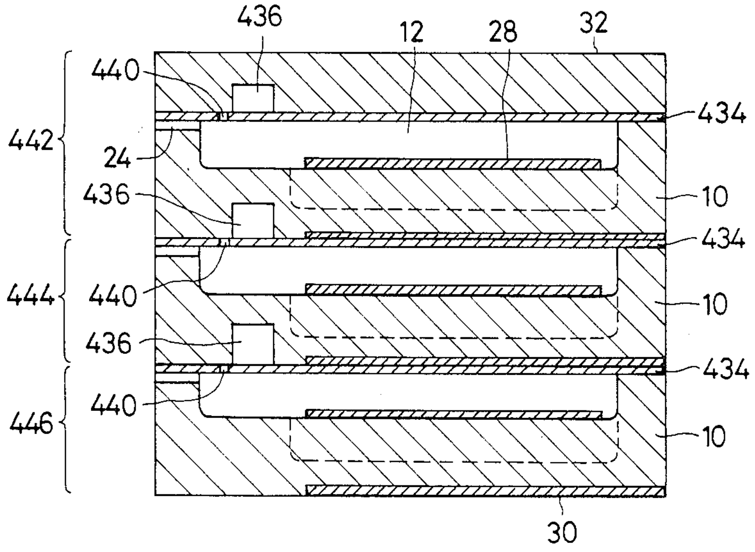

FIG. 21 shows an ink jet recording head assembly, a fourteenth embodiment of the invention. More specifically, the parts (A) and (B) of FIG. 21 are a cross-sectional diagram and a longitudinal-sectional diagram of the recording head assembly, respectively. In FIG. 21, parts corresponding functionally to those already described with reference to FIGS. 2 through 5 are therefore designated by the same reference numerals.

The recording head assembly shown in FIG. 21 is a multi-nozzle type ink jet recording head assembly comprising three recording head units 442, 444 and 446 which are laid one on another, or in the form of three layers. Similarly as in the above-described embodiments, each of the recording head units 442, 444 and 446 essentially comprises the piezo-electric plate 10 and a cover plate 434. In the fourteenth embodiment, the cover plate 434 is made of a thin stainless steel plate for instance 0.01 to 0.02 mm in thickness. In the first recording head unit 442, ink supplying inlets 440 are formed in its cover plate 434 in such a manner that they are communicated with the ink cavities 12, respectively. A surface plate 432 is fixedly provided on the upper surface of the cover plate 434. An ink supplying chamber 436 is formed in the surface plate 432 in such a manner that it is communicated with the ink supplying inlets 440. The ink supplying chamber 436 formed in the surface plate 432 is used for the first recording head unit 442. An another ink supplying chamber 436 is formed in the piezo-electric plate 10 of the first recording head unit 242 so that it is used for the second recording head unit 444.

Figure 22:
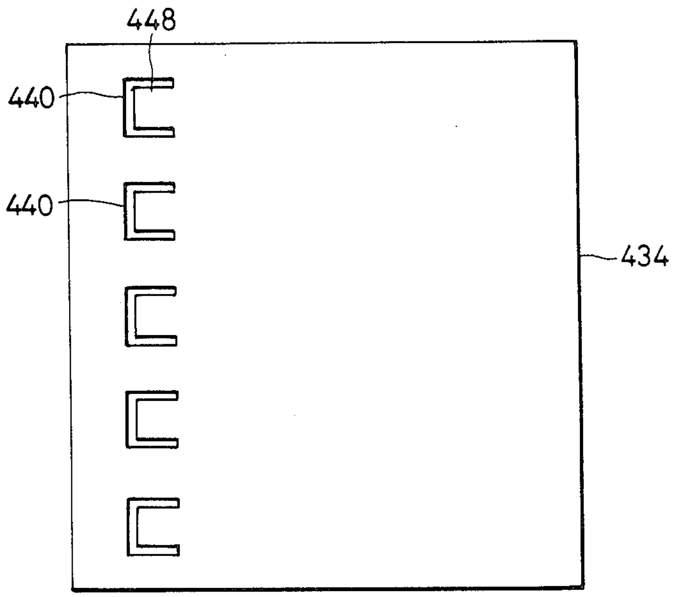
FIG. 22 is a plan view showing a cover plate in the fourteenth embodiment.

FIG. 22 is a plan view of the cover plate 434. As was described above, the ink supplying inlets 440 are formed in the cover plate 434 respectively for the ink cavities 12 in the piezo-electric plate 10. The ink supplying inlets 440 are provided with check valves 448 (described later), respectively.

Figure 23:
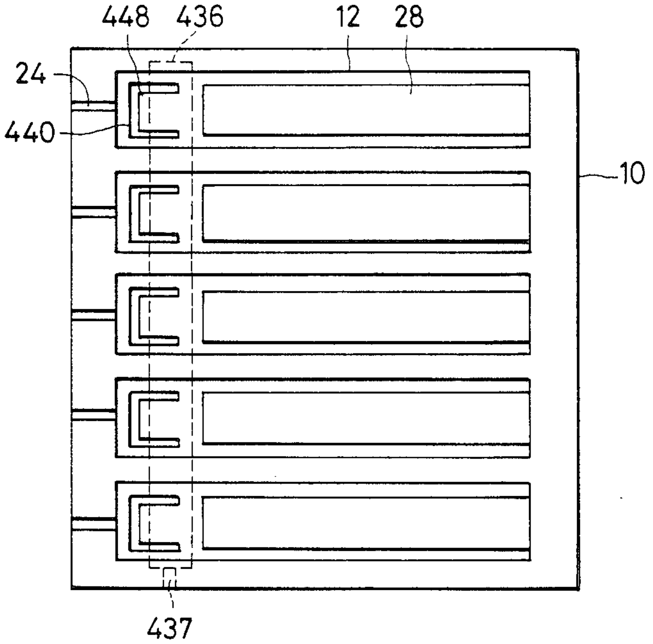
FIG. 23 is a diagram for a description of the relationships between ink cavities, ink supplying inlets and an ink supplying chamber in the fourteenth embodiment.

The relationships between the ink cavities 12, the ink supplying inlets 440 and the ink supplying chamber 436 are as indicated in FIG. 23. More specifically, the ink supplying chamber 436 is long so that is crosses the plurality of ink cavities (five ink cavities in the embodiment) and is provided above the ink cavities 12, and the ink supplying inlets 440 are provided between the ink supplying chamber 436 and the ink cavities 12. In FIG. 23, reference numeral 437 designates an ink injecting hole through which ink is injected into the ink supplying chamber 436. The ink injecting hole 437 is connected to an ink tube (not shown).

Referring back to FIG. 21, similarly as in the case of the first recording head unit, in the second recording unit 444 ink supplying inlets 440 are formed in its cover plate 434. The relationships between the ink supplying inlets 440, the ink supplying chamber 436 formed in the piezo-electric plate 10 of the first recording head unit 442, and the ink cavities 12 formed in the piezo-electric plate 10 of the second recording head unit 444 are the same as those which have been described with reference to FIG. 23. In the second recording head unit 444 also, an ink supplying chamber 436 for the third recording head unit 446 is formed in the piezo-electric plate 10.

In the third recording head unit 446 also, ink supplying inlets 440 are formed in its cover plate 434. The various components of the third recording head unit are arranged in the same manner as those of the second recording head.

When a voltage is applied across a selected pair of electrodes 28 and 30 in the recording head assembly thus constructed, the piezo-electric portion between the electrodes 28 and 30 is expanded to decrease the volume of the respective ink cavity 12, as a result of which the ink in the ink cavity 12 is jetted in the form of a droplet from the ink nozzle 24 communicated with the ink cavity 12 and applied to the recording sheet.

When the application of the voltage across the electrodes 28 and 30 is suspended, the configuration of the piezo-electric portion is restored as shown in the part (A) of FIG. 24. In this operation, a negative pressure is provided in the ink cavity 12, as a result of which the check valve 448 of the ink supplying inlet 440 is opened to allow the ink in the ink supplying chamber 436 to flow into the ink cavity 12 through the check valve to fill up the ink cavity.

When the voltage is applied across the electrodes 28 and 30 again, the piezo-electric portion is expanded again as shown in the part (B) of FIG. 24 to reduce the volume of the ink cavity 12, while the check valve 448 abuts against the edge of the ink supplying chamber 448 to close the ink supplying inlet 440. As is apparent form the above description, when the volume of the ink cavity 12 is decreased, the ink in the ink cavity 12 will never flow back into the ink supplying chamber 436 through the ink supplying inlet 440. Since only one ink passage (or the ink nozzle 24) is connected to the ink cavity 12, the ink in the ink cavity 12 which corresponds to the decrease in volume of the ink cavity is all discharged through the ink nozzle 24. Thus, the change in volume of the ink cavity 12 is effectively utilized for forming an ink droplet.

FIG. 25 shows an ink jet recording head assembly, a fifteenth embodiment of the invention. More specifically, the parts (A) and (B) of FIG. 25 are a cross-sectional diagram and a longitudinal-sectional diagram of the recording head assembly, respectively. In FIG. 25, parts corresponding functionally to those which have been described with reference to FIGS. 21 through 24 are therefore designated by the same reference numerals.

The ink jet recording head assembly of FIG. 25 is made up of three recording head units 464, 466 and 468. Each of the three recording head units essentially comprises the piezo-electric plate 10, the cover plate 434, and an ink supplying chamber board 456. Each of the ink supplying chamber boards 456 has an ink supplying chamber 436 and is made of a glass plate or the like. The ink cavities 12 are formed in the piezo-electric plates 10. A rear board 462 is fixedly secured to the rear end faces of the recording head units 464, 466 and 468 to close the ink cavities 12. A nozzle board 140 is fixedly secured to the front end faces of the recording head units 464, 466 and 468 to close the ink cavities 12. Ink nozzles 142 are formed in the nozzle board 140 in such a manner that they are communicated with the ink cavities 12, respectively.

In the fifteenth embodiment shown in FIG. 25, the ink nozzles are formed separately from the piezo-electric plates 10, and therefore the piezo-electric plates can be machined readily. Furthermore, the recording head units 464, 466 and 468 are completely the same in construction, and therefore the ink jet recording head assembly in FIG. 25 can be more readily manufactured than that of FIG. 21 (the fourteenth embodiment).

FIG. 26 shows an ink jet recording head assembly, a sixteenth embodiment of the invention. More specifically, the parts (A) and (B) of FIG. 26 are a cross-sectional view and a longitudinal-sectional view of the recording head assembly.

In the sixteenth embodiment, no ink supplying inlets are formed in the cover plates 456, and accordingly the ink supplying chamber boards 456 of FIG. 25 are not utilized. However, an ink supplying inlet board 480 is fixedly secured to the rear end faces of the recording head units 470, 472 and 474, and an ink supplying chamber board 476 is fixedly provided on the ink supplying inlet board 480. A plurality of ink supplying inlets 482, which operate in the same manner as the ink supplying inlets 440 of the cover plates 434 shown in FIG. 22, are formed in the ink supplying inlet board 480 in such a manner that they are communicated with the ink cavities 12 in the piezo-electric plates 10. In FIG. 27, reference numeral 484 designates check valves. Ink supplying chamber 436 are formed in the ink supplying chamber board 476 of FIG. 26 in such a manner that they are communicated with the ink supplying inlets 482. Each of the piezo-electric plates 10 has a recess 478 in its rear end portion so that the check valves 484 of the ink supplying inlets 482 can smoothly operate.

As is apparent from the above description, in the fourteenth, fifteenth and sixteenth embodiments of the invention, the ink supplying inlets have the check valves, which prevents the difficulty that the ink in the ink cavity flows back into the ink supplying chamber in the ink jetting operation.

FIG. 28 shows a seventeenth embodiment of the invention, which is a multi-layer multi-nozzle type ink jet recording head assembly comprising three recording head units 540, 542 and 544 which are laid one on another, or in the form of three layers.

Each of the recording head units 540, 542 and 544 comprises a piezo-electric plate 10, a cover plate 532 and an ink supplying chamber board 456. Similarly as in above-described embodiments, ink cavities 12 are formed in each of the piezo-electric plates 10, and electrodes 28 and 30 are provided on the piezo-electric plates 10. However, it should be noted that, in the seventeenth embodiment the cover plates 532 fixedly provided on the respective piezo-electric plates 10 have ink supplying inlets 548, and an ink supplying chamber board 456 having an ink supplying chamber communicated with the ink supplying inlets 548 is fixedly provided on each of the cover plates 532. Each of the cover plates 532 is made of a thin metal plate such as a stainless steel plate, and each of the ink supplying chamber boards 456 is made of a glass plate.

In the seventeenth embodiment shown in FIG. 28, the ink cavities 12 are formed in each of the piezo-electric plates 10 in such a manner as to cover its entire width; that is, the ink cavities 12 only are formed in the piezo-electric plates 10. A rear board 462 is fixedly provided on the rear end faces of the recording head units 540, 542 and 544 to close the ink cavities 12 at one end, while a nozzle board 140 is also fixedly provided on the front end faces of the recording head units to close the ink cavities 12 at the other end. A plurality of ink nozzles 142 are formed in the nozzle board 140 in such a manner that they are communicated with the ink cavities 12, respectively.

The seventeenth embodiment shown in FIG. 28 is different from the fifteenth embodiment shown in FIG. 25 in that, in the seventeenth embodiment, the ink supplying inlets 548 formed in the cover plates 532 have not check valve means and are merely through-holes.

FIG. 29 shows a multi-layer multi-nozzle type ink jet recording head assembly, an eighteenth embodiment of the invention, which is made up of three recording head units 632, 634 and 636 which are laid one on another, or in the form of three layers. More specifically, the part (A) and (B) of FIG. 29 are a cross-sectional diagram and a longitudinal-sectional diagram of the recording head assembly, respectively.

Similarly as in the above-described embodiments, each of the recording head units 632, 634 and 636 essentially comprises the piezo-electric plate 10 and the cover plate 26. In the eighteenth embodiment of FIG. 29, ink supplying inlets 336 are formed in the portion of each of the cover plates 26 which is on the same side as the ink nozzles 24 and confronts with the ink nozzles 24, and an ink supplying chamber board 638 is fixedly provided on the upper surface of each of the cover plates 26. An ink supplying chamber 640 is formed in each of the ink supplying chamber boards 638 in such a manner that is communicated with the ink supplying inlets 336 formed in the cover plate 26.

In the eighteenth embodiment, as shown in the part (A) of FIG. 30 the voltage applying electrodes 28 provided in the ink cavities 12 are extended to the upper surface of the piezo-electric plate 10 from the bottoms of the ink cavities 12, and connected through a bridge part 644 to one another. Furthermore, as shown in the part (B) of FIG. 30 which is a bottom view of the piezo-electric plate 10, voltage applying electrodes 30 are provided on the lower surface of the piezo-electric plate 10 in such a manner that they are confronted through the piezo-electric plate 10 with the electrodes 28 and extended individually to the right-hand end of the piezo-electric plate 10. That is, the electrodes 28 thus electrically connected together are employed as a common electrode, while the electrodes 30 are used as individual electrodes.

As is apparent from the part (B) of FIG. 29, the length of the first recording head unit 632 in the longitudinal direction of the piezo-electric plate 10 is longer than that of the second recording head unit 634, and the length of the second recording head unit 634 is longer than that of the third recording head unit 636, so that the individual electrodes 30 on the lower surface of each of the piezo-electric plate 10 are exposed outside. Therefore, wires (not shown) can be connected to the individual electrodes 30 by wire bonding, or the individual electrodes 30 may be connected to a flexible printed circuit board on which a pattern similar in configuration to the individual electrodes 30 has been printed. A wire is connected to one end portion 646 of the bridging part 644 of the electrodes 28 (forming the common electrode).

When a voltage is applied across a selected one of the individual electrodes 30 and the common electrode 28, the volume of the ink cavity having the individual electrode 30 is changed, so that the ink in the ink cavity is jetted from the respective ink nozzle.

As conducive to a full understanding of the relationships between the ink supplying chamber 640 and the ink nozzles 24, the ink supplying chamber 640 is indicated by the dotted line in the part (A) of FIG. 30. The ink is supplied froman ink reservoir (not shown) through an ink tube (not shown) into the ink supplying chamber.

FIG. 31 shows a multi-layer multi-nozzle type ink jet recording head assembly, a nineteenth embodiment of the invention, which comprises three recording head units 650, 652 and 654 which are laid one on another, or in the form of three layers. More specifically, the parts (A) and (B) of FIG. 31 are a cross-sectional diagram and a longitudinal-sectional diagram of the recording head assembly, respectively. In the nineteenth embodiment of the invention, an ink supplying chamber 132 is formed in each of the piezo-electric plates 10 in such a manner as to communicate with the respective ink supplying inlet 22. The electrodes 28 are formed on the piezo-electric plate 10 in the same pattern as those shown in the part (A) of FIG. 19.

The eighteenth embodiment shown in FIGS. 29 and 30 and the nineteenth embodiment shown in FIG. 31 can be effectively employed especially in the case where the ink used is electrically conductive. That is, as the individual electrodes 30 are not in contact with the ink, the cross talk between adjacent electrodes through the ink can be prevented. However, in the case where the ink used is not electrically conductive, the following ink jet recording head assembly, a twentieth embodiment of the invention, may be used.

The ink jet recording head assembly, the twentieth embodiment of the invention, is as shown in FIG. 32. More specifically, the parts (A) and (B) of FIG. 32 are a cross-sectional diagram and a longitudinal-sectional diagram of the recording head assembly, respectively. The recording head assembly is a multi-layer multi-nozzle type ink jet recording head assembly comprising three recording head units 660, 662 and 664 which are laid one on another, or in the form of threelayers. As shown in the part (A) of FIG. 33 which is a top view of each of the piezo-electric plates 10 of the recording head assembly, the electrodes 28 provides in the ink cavities of each of the piezo-electric plates 10 are separately extended to the right-hand end of the piezo-electric plate 10 so that they are used as individual or separate electrodes. On the other hand, as shown in the part (B) of FIG. 33 which is a bottom view of each of the piezo-electric plates 10, the electrodes 30 provided on the lower surface of the piezo-electric plate 10 are electrically connected to one another through a bridging part 668 so that they are used as common electrodes. The bridging part 668 has a wire bonding end portion. As is apparent fromthe part (A) of FIG. 32, the length of the first recording head unit 660 in the longitudinal direction of the ink cavity is shorter than that of the second recording head unit 662, and the length of the second recording head unit 662 is shorter than that of the third recording head unit 664, and the cover plate 26 and the ink supplying 638 of each of the piezo-electric plates 10 are shorter than the piezo-electric plate 10 so that the electrodes 28 of the piezo-electric plates 10 are exposed outside. Similarly as in the case of the above-described embodiment, wires are connected to the exposed portions of the individual electrodes 28 or a flexible printed circuit board is connected thereto.

As was described above, in the eighteenth through twentieth embodiments, a plurality of piezo-electric plates each having the voltage applying electrodes on both surfaces are laid one on another in such a manner that the electrodes on the upper or lower surfaces of the piezo-electric plates which are used as the individual control electrodes are exposed outside at the ends. Therefore, the lead wires can be readily connected to the electrodes.

As is apparent from the above description, in the ink jet recording head according to the invention, a plurality of ink cavities are formed in the piezo-electric plate of piezo-electric material in such a manner that they are arranged in parallel with one another, and the cover plate is fixedly placed on the piezo-electric plate. Therefore, the ink jet recording head of the invention is compact and can be readily manufactured.

What is claimed is:

1. An ink jet recording head in which the ink in an ink cavity is jetted in the form of a droplet from an ink nozzle by utilizing a piezo-electric effect, comprising:

a piezo-electric plate made of piezo-electric material and having a plurality of elongated ink cavities formed therein, each of said plurality of elongated ink cavities has two deep grooves formed in the longitudinal direction of said ink cavities and a shallow groove provided between said two deep grooves;

a cover plate fixedly placed on said piezo-electric plate; and voltage applying electrodes provided on piezo-electric portions which form said shallow grooves.

2. An ink jet recording head as claimed in claim 1, wherein:

ink nozzles are formed in said piezo-electric plate in such a manner that said ink nozzles are communicated with said ink cavities, respectively.

3. An ink jet recording head as claimed in claim 1, wherein:

ink supplying inlets are formed in said piezo-electric plates in such a manner that said ink supplying inlets are communicated with said ink cavities.

* * * * *